US006738690B2

(12) United States Patent
Veenstra

(10) Patent No.: US 6,738,690 B2
(45) Date of Patent: May 18, 2004

(54) INFORMATION MANAGEMENT OF SUPPLY FLOW OF DISPENSED OBJECTS

(75) Inventor: John H. Veenstra, Pittsford, NY (US)

(73) Assignee: PJ Solutions, Inc., Fairport, NY (US)

( * ) Notice: Subject to any disclaimer, the term of this patent is extended or adjusted under 35 U.S.C. 154(b) by 120 days.

(21) Appl. No.: 10/215,239

(22) Filed: Aug. 8, 2002

(65) Prior Publication Data

US 2004/0030445 A1 Feb. 12, 2004

(51) Int. Cl.[7] .................................... G06F 17/00

(52) U.S. Cl. .................... 700/236; 700/242; 221/197; 221/287; 235/381

(58) Field of Search .................... 700/231, 232, 700/236, 242, 243, 244; 221/11, 197, 287; 235/381, 385

(56) References Cited

U.S. PATENT DOCUMENTS 4,194,647 A * 3/1980 Spurrier .................... 221/97
4,236,649 A 12/1980 Fellner et al. ............. 221/90
4,681,504 A 7/1987 Welch, Sr. ............... 414/268
4,785,969 A * 11/1988 McLaughlin ................ 221/2
4,903,815 A 2/1990 Hirschfeld et al. ......... 194/205
5,073,078 A 12/1991 Merlo .................... 414/274
5,313,393 A 5/1994 Varley et al. ............. 364/403
5,887,715 A 3/1999 Vasudeva .................. 206/373
6,131,399 A 10/2000 Hall ....................... 62/127
6,208,044 B1 3/2001 Viswanadham et al. ...... 310/12
6,338,007 B1 1/2002 Broadfield et al. ......... 700/231
6,540,102 B2 * 4/2003 Gates et al. ............... 221/75

FOREIGN PATENT DOCUMENTS

DE 3820086 2/1990
JP 56-047856 4/1981

* cited by examiner

*Primary Examiner*—Khoi H. Tran
(74) *Attorney, Agent, or Firm*—Brown & Michaels, PC

(57) ABSTRACT

An information management system is applied to a supply flow of dispensed objects by incorporating microcircuitry into a portable dispensing case that is loaded with objects at a loading site and transported to a dispensing site where the objects are dispensed from the portable case. A communication connection connects the microcircuitry with a reload controller at the loading site and a dispensing controller at the dispensing site. By means of the communication connection loading information on the identities and locations of objects in the case is supplied to the microcircuitry where it is made available at the dispensing site, and transactional information involved in dispensing of the objects at the dispensing site is loaded into the microcircuitry for return to the reloading site. Such an arrangement allows analysis of the transactional information and the loading information showing actual usage of objects at both the dispensing site and the reloading site.

10 Claims, 2 Drawing Sheets

INFORMATION MANAGEMENT OF SUPPLY FLOW OF DISPENSED OBJECTS

TECHNICAL FIELD

Producing information on the dispensing of objects.

BACKGROUND

The need for better inventory management and more efficient supply chain flow of dispensable tools and parts has led to a variety of dispensing machines. Some of these machines have produced information on the dispensing of objects, but the production and flow of such information has been expensive and inefficient. Information flow systems accompanying such dispensers have included wired, wireless, and internet connections. The cost and complexity of these have resulted in many supply chains for dispensable tools and objects continuing to operate with manual and inadequate control systems.

The invention aims to solve these problems by making a dispensing system inexpensive to buy and maintain while being able to provide all the information necessary for efficient supply chain control. The inventive way of meeting these needs can make more efficient supply chain dispensing and control available to small users as well as large.

SUMMARY

The inventive system accomplishes its goals by combining several features. To insure low cost, for example, the invention uses portable dispensing cases that can be filled at a loading site with objects to be dispensed at a dispensing site. Besides the convenience of transporting dispensable objects in portable cases, the cases also carry information flowing back and forth between the loading site and the dispensing site.

For this purpose, each case is provided with microcircuitry that includes a memory of the objects loaded into the case. By means of connections with the onboard microcircuitry, the portable cases communicate with a dispensing controller at the dispensing site and with a reload controller at the loading site.

The reload controller sends loading information to the microcircuitry in the case, which retains a memory of the loaded objects and their locations within the case. This memory moves with the case to the dispensing site where the loading information is available to the dispensing controller.

The dispensing controller has an interface accessible to a requester of an object, and the dispensing controller can be programmed with whatever transactional information and requirements are appropriate to the dispensing of objects. For example, a person requesting an object and working via the interface can input a PIN, a job number, a request for an object, and possibly additional information such as a machine, product, project, or other identity intending to use the object. The dispensing controller cooperates with the microcircuitry in the portable case to dispense an object whenever an object request is authorized. Transactional information about the object dispensing is thus acquired by the dispensing controller and is communicated to the microcircuitry in the portable case for return to the loading site.

Information on what is available for dispensing, what has been dispensed, and other transactional information can be downloaded from the dispensing controller at the dispensing site for management control of the facility where the objects are used. Similarly, such information returns via the microcircuitry in the portable case to the loading site where it can be downloaded, preferably via the reload controller, for management control of the supply chain. All this makes the information flow effective and low-cost and allows the supply chain to respond to actual usage, rather than demand or estimates of possible future usage, which also improves efficiency.

DRAWINGS

DETAILED DESCRIPTION

Figure 1:
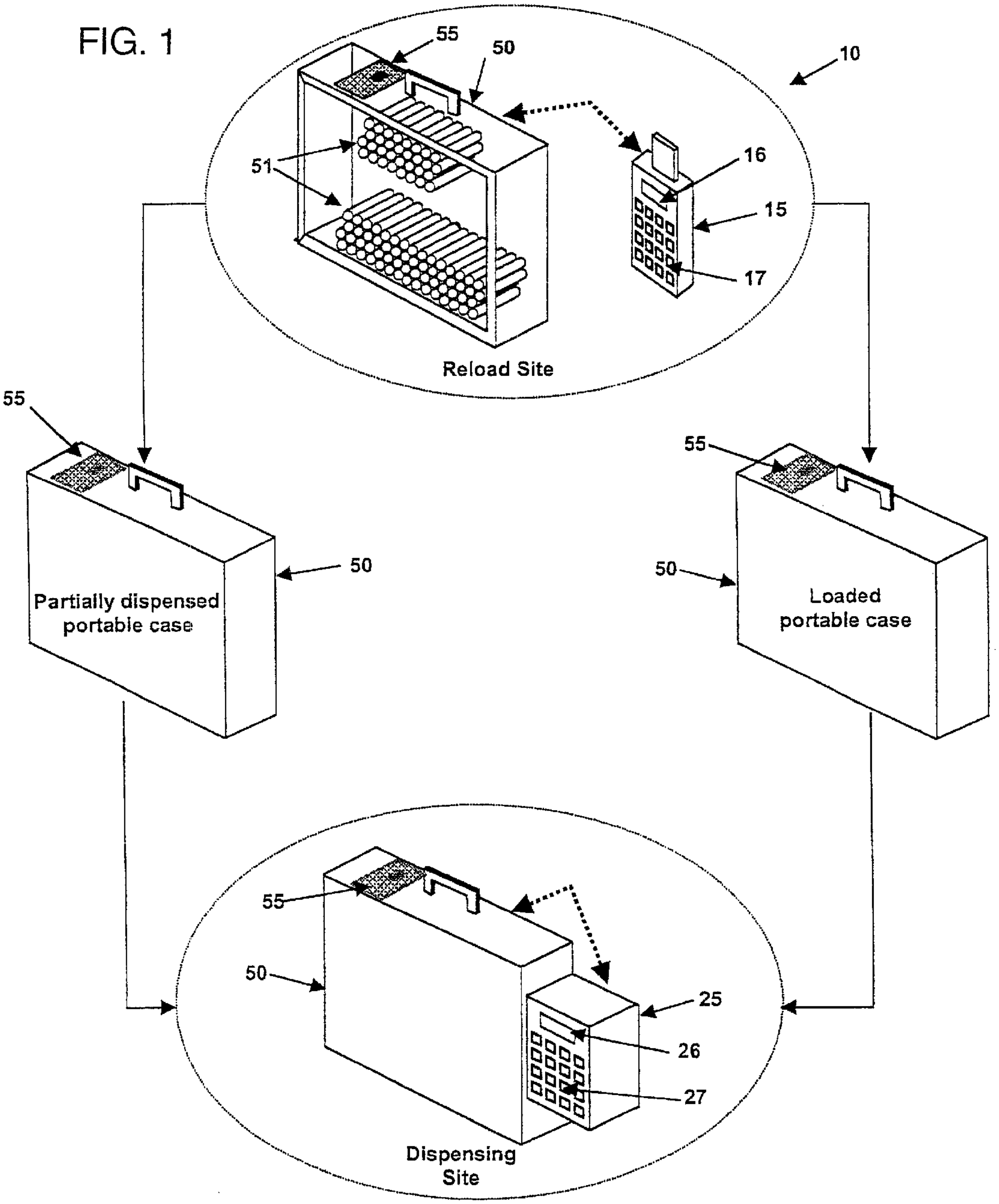
FIG. 1 is a schematic diagram of the inventive information management system using a portable case acquiring loading information at a reloading site and transactional information at a dispensing site and carrying such information with the portable case as it moves back and forth between the two sites.
Figure 2:
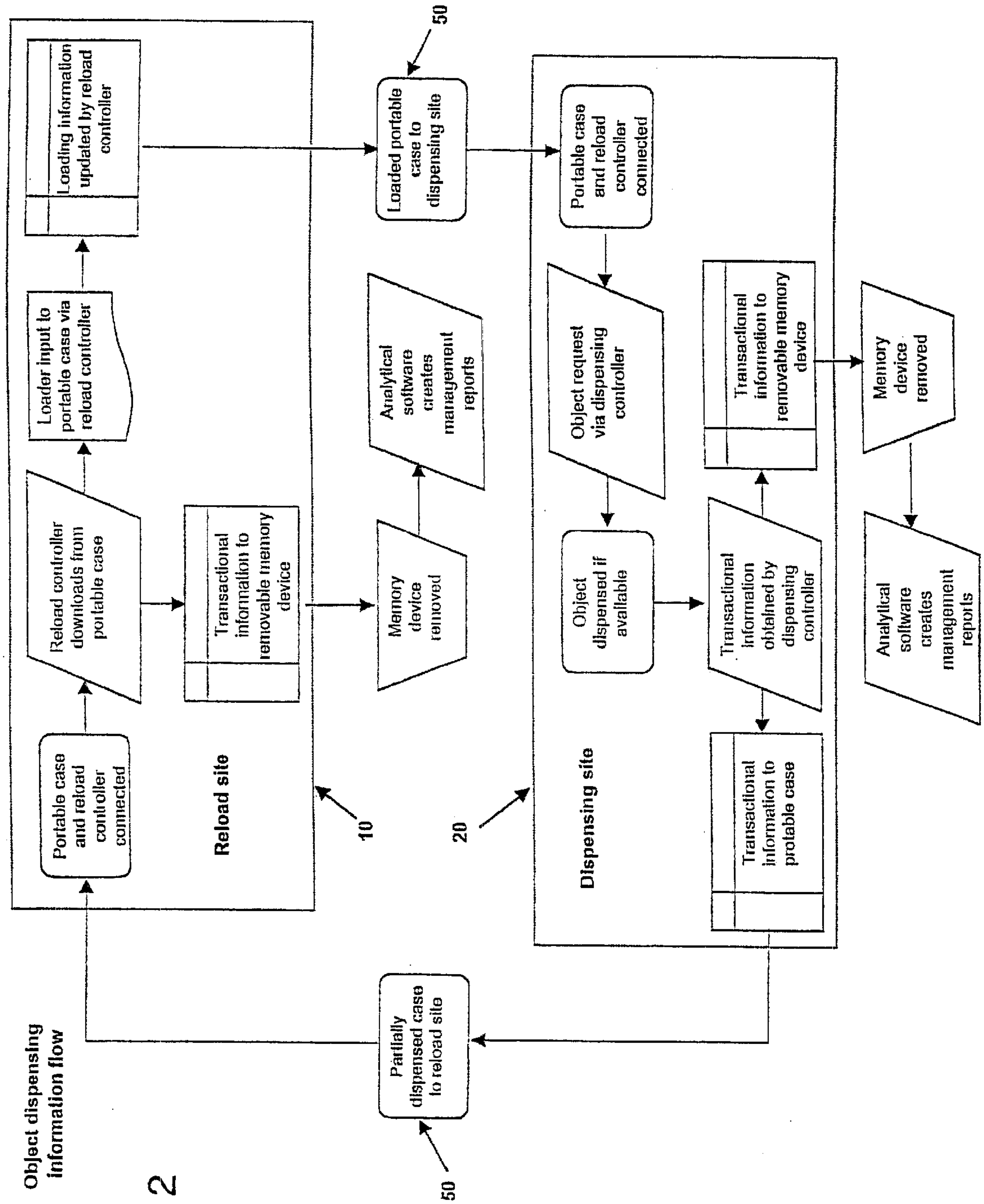
FIG. 2 is a schematic flow diagram of the information flow involved in the movement of the portable dispensing case as illustrated in FIG. 1.

As shown in the drawings, information flow for a supply of objects travels with a portable case 50 both ways between a reload site 10 and a dispensing site 20. The portable case 50 is loaded with objects 51 for dispensing and also contains microcircuitry 55 retaining information on the identities and locations of the loaded objects 51 as the case moves from the reload site 10 to the dispensing site 20. The loading information is used at the dispensing site in co-operation with a dispensing controller 25 to dispense objects. As this occurs, transactional information generated by the dispensing controller 25 is supplied to the microcircuitry 55 in the portable case 50 for return to the reload site. There, the transactional information is downloadable from the portable case, preferably by a reload controller 15, which also directs reloading of the portable case for a return trip to the dispensing site.

The availability of both the loading and transactional information at the dispensing site and the reload site aids in analyzing and managing the supply flow of the objects. This can be done on a usage basis, rather than a demand basis, which significantly enhances efficiency.

In this context, a demand basis for a supply flow is based on estimates of future needs and is encumbered by the errors that such estimates necessarily involve. A usage basis for managing the supply flow is based on past usage, which is often more reliable than human estimates of future needs. Both of these management tools can be combined by the present invention to provide supply flow management based on actual past usage that can be adjusted or modified to accommodate envisioned future changes.

The movement of the necessary information with the portable case traveling between the reload and dispensing sites helps reduce the cost of the system. The availability at the reloading site of transactional information generated at the dispensing site enables a supplier to manage object flow on an efficient usage basis, and the availability at the dispensing site of the object loading information helps reduce the cost of dispensing. An important benefit of this type of transactional data is the ability to do variance analysis and correlation studies of the various transactions and combinations of transactions. Combining the information flow with the movements of the portable cases transporting objects between the sites also reduces the costs of information transmission, object loading, and object dispensing. Overall, the inventive system accomplishes everything necessary for both object dispensing and information management of the supply flow of the objects dispensed at costs well below those incurred by present systems.

The illustrated system can be used for dispensing a wide variety of objects 51. One possibility is cutting tools used in machine tool operations, and other possibilities include small parts used for assembly, and tools or kits of objects used for different purposes. This type of dispensing system can easily be adapted to dispensing medical supplies, controlled substances, and prescription drugs at hospitals, pharmacies, and nursing homes. All these possibilities are generally referred to as "objects" and can include anything desired in a supply chain that is small enough to allow a reasonable number to be carried in a portable case.

Objects 51 can be packaged in dispensable containers, which has the advantage of making all the containers uniform while holding objects of different shapes and sizes. Packaging also protects the object contents and could be environmentally sealed if desired. Schematically illustrated circles 51 representing objects as shown in FIG. 1 represents end views of cylindrical object packages 51 that can be dispensed from container 50. Package shapes other than cylindrical are also possible, and the inventive system can also be used for dispensing objects that are not packaged.

Portable cases 50 have an array of spaces available for receiving and holding objects 51 for transport to a dispensing site where the objects can be dispensed. These spaces or locations within cases 50 are filled with objects 15 at reloading site 10 in a predetermined manner. Preferably based on information about past usage and any foreseeable future changes, reload controller 15 is programmed to direct the loading of a predetermined variety of objects 51 into each portable case 50. The number and variety of the objects loaded in each case 50 will be intended to meet the expected usage requirements at the dispensing site 20.

Reload controller 50, which preferably directs the loading of objects 51 into cases 50, preferably includes a display panel 16 and a keypad 17 offering a communication interface with a person loading case 50. The loader can then be prompted and instructed via display panel 16, and can enter loading information via keypad 17. Reload controller 15 is preferably programmed to receive and respond to object loading requests, indicate predetermined object loading information, and accept confirmations that indicated objects have been loaded into a particular case 50. Such intercommunication with a person loading case 50 generates loading information that reload controller 15 supplies to microcircuitry 55 arranged in case 50. Microcircuitry 55 preferably includes a non-volatile memory that can retain loading information without requiring a power supply, so that the loading information can travel intact with a case 50 from loading site 10 to dispensing site 20.

Each portable case 50 preferably has a connector (physical, RF, optical, etc.) communicating with microcircuitry 55 so that reload controller 15 and dispensing controller 25 can each be connected to microcircuitry 55, as schematically illustrated by double headed arrows in FIG. 1. When a case 50 arrives at dispensing site 20 it is then conveniently connected to dispensing controller 25. Case 50 is also preferably arranged at dispensing site 20 in a position that allows direct dispensing of objects 51. This can be accomplished, for example, by a panel (not shown) that is removable from case 50 to allow objects to be released and gravitationally dispensed from a case 50 arranged at dispensing site 20.

Upon arrival at dispensing site 20, microcircuitry 55 retains information not only on the objects loaded into case 50, but their locations within case 50. This is preferably accomplished via programmed direction of reload controller 15, which has co-operated with a human loader to indicate objects and loading positions, which a human loader has followed and acknowledged. Such loading information in microcircuitry 55 then becomes available to co-operate with dispensing controller 25 for accurately dispensing objects on request.

Dispensing controller 25 also preferably includes a display panel 26 and a keyboard 27 forming an interface with a requester or user of dispensed objects. Interactions of a user with dispensing controller 25 can then generate transactional information involving the dispensing of objects. Such transactional information can include: the user PIN, a job number, object ID, and code numbers for things such as machine or line using the object, customer or purchase order for which object is intended, and anything else desired. A user requiring an object can then enter a request via keypad 27, and the dispensing controller can check with microcircuitry 55 to verify that the requested object is available, and can inform the requesting user of the object availability via display panel 26. The requester can then enter whatever transactional information is required via keypad 27, and this can be done while following programmed prompts visible to the requester in display 26. Once the transactional information is completely entered and the requested object is available, dispensing controller 25 can implement a dispensing actuation via microcircuitry 55 to release a requested one of the objects 51.

A variety of mechanisms are available for holding objects 51 in case 50 until a dispensing request is activated. The holding mechanisms are then activatible to release a selected one of the objects 51, which is preferably dispensed gravitationally from case 50. Requirements for the holding and releasing mechanisms are preferably electrically activatible and light enough in weight so as not to encumber case 50 in its handling and transport.

The transactional information generated by dispensing controller 25 is preferably made available at the dispensing site for management purposes. This can be done by loading the transactional information into a removable memory device that can be removed to a computer or analytical station where analytical software can create management reports on object usage. The transactional information is also loaded into microcircuitry 55 by dispensing controller 25 for return to reload station 10 with case 50.

Transactional information is also downloadable at the reload site, preferably via reload controller 15, which can then load the transactional information into a removable memory device. Again, such a moveable memory device can be taken to a computer so that analytical software can prepare management reports based on the object usage represented by the transactional information.

Either reload controller 15 or dispensing controller 25 can be a commercially available computer, but can also be a less expensive programmable microprocessor, which is preferred to keep system costs low. Information transfer from microcircuitry 55, reload controller 15, and dispensing controller 25 can be transmitted by wire or other media, without relying on a movable memory device. With presently available technology, though, a movable memory device is the most cost effective.

I claim:

1. An information management system applied to a supply flow of dispensed objects, the system comprising:

a. a portable dispensing case loadable with objects at a loading site and transportable to a dispensing site where the objects are dispensed from the portable case;

b. the portable case containing microcircuitry and a communication connection that connects the microcircuitry to a reload controller at the loading site and to a dispensing controller at the dispensing site;

c. the reload controller communicating to the microcircuitry loading information involving identities and locations of objects loaded into the case for dispensing;

d. the loading information traveling with the microcircuitry in the portable case from the loading site to the dispensing site and being used in response to dispensing requests from the dispensing controller to dispense objects at the dispensing site;

e. the dispensing controller communicating to the microcircuitry in the portable case transactional information involving dispensing of the objects at the dispensing site; and f. the transactional information traveling with the microcircuitry in the portable case from the dispensing site to the loading site where the transactional information is downloadable from the microcircuitry.

2. The system of claim 1 wherein the reload controller is arranged to accomplish downloading of the transactional information from the microcircuitry.

3. The system of claim 1 wherein the dispensing controller has an interface accessible to a requester of an object, and the transactional information is entered into the dispensing controller via the interface.

4. An objects dispensing system comprising:

a. microcircuitry arranged in a portable case having an array holding a plurality of objects to be dispensed;

b. the microcircuitry having a memory representing identities and locations of objects loaded into the array at a loading site;

c. the memory being usable to dispense objects from the array at a dispensing site that removeably receives and holds the case in position for dispensing the objects gravitationally from the array;

d. a dispensing controller at the dispensing site having an interface accessible to a requester of an object who enters via the interface transactional information related to a request for an object;

e. the dispensing controller having a communication connection with the microcircuitry in the case when the case is positioned at the dispensing site so that the dispensing controller and the microcircuitry in the case cooperate to dispense objects from the array and so that the controller communicates to the microcircuitry in the case the transactional information related to object requests; and f. the microcircuitry being arranged to return the transactional information with the portable case to the loading site.

5. The system of claim 4 including a reload controller deployed at the loading site to install the memory in the microcircuitry in the case and to download the transactional information from the microcircuitry in the case.

6. A method of managing information relating to a supply flow of dispensable objects:

a. arranging a portable case to be loaded at a loading site with objects to be dispensed so that the case is transportable from the loading site to a dispensing site where the objects are dispensed;

b. programming a reloading controller at the loading site to direct the loading of the objects into the case;

c. arranging microcircuitry within the case to receive and retain loading information on the identities and locations of objects loaded into the case so that the loading information travels with the microcircuitry in the case to the dispensing site;

d. arranging a dispensing controller at the dispensing site to communicate with the microcircuitry in the case to control the dispensing of the objects from the case;

e. programming the dispensing controller to transmit to the microcircuitry in the case transactional information on the dispensing of objects from the case so that the transactional information returns with the microcircuitry in the case to the reloading site; and f. downloading at the reloading site the transactional information stored in the microcircuitry in the case.

7. The information managing method of claim 6 including arranging the reloading controller to download the transactional information from the microcircuitry in the case at the reloading site.

8. The method of claim 6 including analyzing the transactional information to determine object reloading requirements.

9. The method of claim 8 including reprogramming the reloading controller based on the analysis of the transactional information.

10. The method of claim 6 including using the reload controller to send the loading information to the microcircuitry.

* * * * *